United States Patent
Takahashi et al.

(10) Patent No.: US 10,281,799 B2
(45) Date of Patent: May 7, 2019

(54) IMAGING APPARATUS AND BLADE-DRIVING DEVICE

(71) Applicant: SEIKO Precision Inc., Matsudo-shi, Chiba (JP)

(72) Inventors: Hiroshi Takahashi, Matsudo (JP); Yoichi Nakano, Matsudo (JP)

(73) Assignee: SEIKO PRECISION INC., Chiba (JP)

( * ) Notice: Subject to any disclaimer, the term of this patent is extended or adjusted under 35 U.S.C. 154(b) by 0 days.

(21) Appl. No.: 15/911,675

(22) Filed: Mar. 5, 2018

(65) Prior Publication Data

US 2018/0252987 A1 Sep. 6, 2018

(30) Foreign Application Priority Data

Mar. 6, 2017 (JP) ................................. 2017-042224

(51) Int. Cl.

| G03B 9/14 | (2006.01) |
| G03B 9/40 | (2006.01) |
| H04N 5/235 | (2006.01) |
| H04N 5/376 | (2011.01) |

(52) U.S. Cl.
CPC ................ G03B 9/14 (2013.01); G03B 9/40 (2013.01); H04N 5/2353 (2013.01); H04N 5/3765 (2013.01)

(58) Field of Classification Search
None
See application file for complete search history.

(56) References Cited

U.S. PATENT DOCUMENTS

| 2012/0249849 | A1* | 10/2012 | Nakano | ................ H04N 5/2353 348/296 |
| 2014/0247387 | A1* | 9/2014 | Nakano | ................ H04N 5/2353 348/367 |
| 2015/0229817 | A1* | 8/2015 | Nishimura | ............... G03B 9/14 348/367 |
| 2015/0268533 | A1* | 9/2015 | Oishii | ...................... G03B 9/40 396/471 |

FOREIGN PATENT DOCUMENTS

JP    2014-191225 A    10/2014

* cited by examiner

*Primary Examiner* — William B Perkey
(74) *Attorney, Agent, or Firm* — Brinks Gilson & Lione

(57) ABSTRACT

An imaging apparatus is provided, including a blade-driving device and a driving control unit which drives the front curtain actuator and the rear curtain actuator. The front curtain and the rear curtain are positioned at the open position at a time of start and termination of imaging, in which the front curtain moves from the closing position to the open position, and the rear curtain moves from the open position to the closing position, thereby performing an exposure operation. During consecutive photographing, the front curtain positioned at the closing position is moved once in a direction of the open position and is then returned to the closing position after the rear curtain is moved to the open position after termination of the exposure operation, and before a subsequent exposure operation is performed.

7 Claims, 6 Drawing Sheets

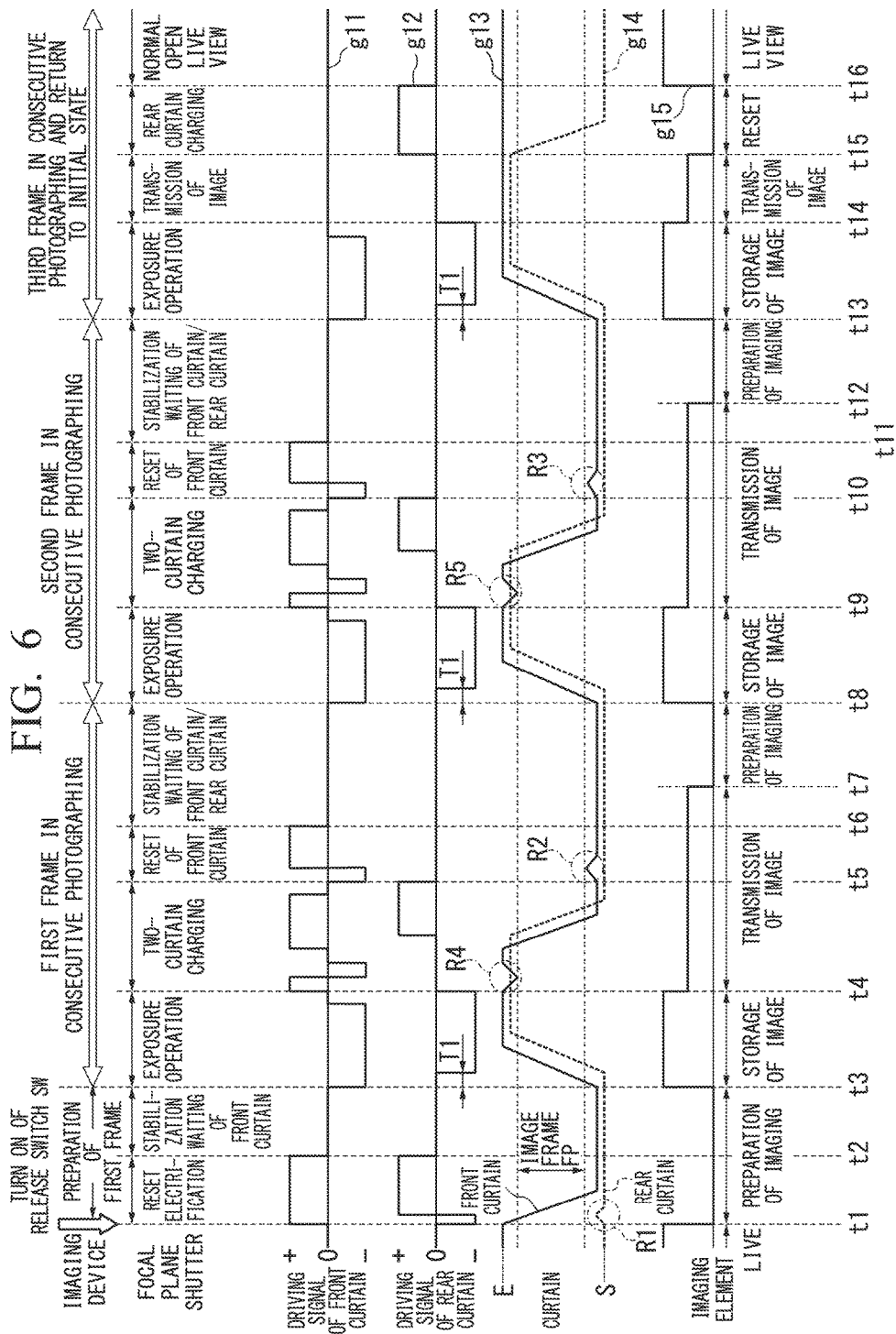

IMAGING APPARATUS AND BLADE-DRIVING DEVICE

RELATED APPLICATIONS

This application claims priority under 35 U.S.C. § 119 to Japanese Patent Application No. 2017-042224 filed on Mar. 6, 2017, the entire content of which is hereby incorporated by reference.

BACKGROUND OF THE INVENTION

1. Field of the Invention

The present invention relates to an imaging apparatus and a blade-driving device.

2. Description of the Related Art

In electromagnetic focal plane shutters, shutters operating in a normal closed manner instead of operating in a normal open manner in consecutive photographing are known (for example, Japanese Unexamined Patent Application, First Publication No. 2014-191225). In an imaging apparatus disclosed in Japanese Unexamined Patent Application, First Publication No. 2014-191225, an exposure operation is performed in order of the return of a front curtain, the moving of the front curtain, and the moving of a rear curtain at a first shot during consecutive photographing. On the other hand, an exposure operation is performed in order of the return of the rear curtain, the moving of the front curtain, and the moving of the rear curtain after a second shot (see FIG. 9 in Japanese Unexamined Patent Application, First Publication No. 2014-191225). Meanwhile, in this application, the return or a charging operation to be described later means an operation of moving the curtain to a position prepared for the exposure operation, and particularly, the return means an operation of returning the curtain to an initial state. In this application, in a case where the front curtain and the rear curtain are collectively referred, both the curtains will be simply described as a curtain.

SUMMARY OF THE INVENTION

As described above, in the imaging apparatus disclosed in Japanese Unexamined Patent Application, First Publication No. 2014-191225, the front curtain is returned immediately before the exposure operation at the first shot during the consecutive photographing, while the rear curtain is returned immediately before the exposure operation after the second shot. In this case, there is a possibility that the position of the front curtain at the time of the start of the exposure operation becomes unstable due to an impact given to the front curtain during the return of the rear curtain, after the second shot. In this case, for example, a moving start timing of the front curtain changes between the first shot and after the second shot, which may result in a change in an exposure time.

The present invention is contrived in view of the above-described problems, and an object thereof is to provide an imaging apparatus and a blade-driving device which are capable of obtaining a satisfactory accuracy of exposure even in a consecutive operation.

In order to accomplish the above-described object, the following aspects are adopted.

(1) According to an aspect of the present invention, an imaging apparatus includes a blade-driving device which includes a front curtain and a rear curtain which are capable of moving between a closing position where an opening is closed and an open position where the opening is opened, and a front curtain actuator that drives the front curtain and a rear curtain actuator that drives the rear curtain, and a driving control unit which drives the front curtain actuator and the rear curtain actuator. The front curtain and the rear curtain are positioned at the open position at a time of start and termination of imaging. The front curtain moves from the closing position to the open position, and the rear curtain moves from the open position to the closing position, thereby performing an exposure operation. During consecutive photographing, the front curtain positioned at the closing position is moved once in a direction of the open position and is then returned to the closing position after the rear curtain is moved to the open position after termination of the exposure operation at first time, and before a subsequent exposure operation is performed.

(2) In the imaging apparatus according to (1), during consecutive photographing, the front curtain positioned at the closing position may be moved once in a direction of the open position while maintaining the opening in a closed state and may then be returned to the closing position after the rear curtain is moved to the open position after termination of the exposure operation at first time, and before the subsequent exposure operation is performed.

(3) According to another aspect of the present invention, an imaging apparatus includes a blade-driving device which includes a front curtain and a rear curtain which are capable of moving between a closing position where an opening is closed and an open position where the opening is opened, and a front curtain actuator that drives the front curtain and a rear curtain actuator that drives the rear curtain, and a driving control unit which drives the front curtain actuator and the rear curtain actuator, in which the front curtain and the rear curtain are positioned at the open position at a time of start and termination of imaging, in which the front curtain moves from the closing position to the open position, and the rear curtain moves from the open position to the closing position, thereby performing an exposure operation, and in which the front curtain positioned at the open position is moved once in a direction of the closing position and is then returned to the open position before the rear curtain is moved to the open position after termination of the exposure operation.

(4) According to still another aspect of the present invention, a blade-driving device is provided, including a front curtain and a rear curtain which are capable of moving between a closing position where an opening is closed and an open position where the opening is opened, and a front curtain actuator which drives the front curtain and a rear curtain actuator which drives the rear curtain, in which the front curtain and the rear curtain are positioned at the open position at a time of start and termination of imaging, in which the front curtain moves from the closing position to the open position, and the rear curtain moves from the open position to the closing position, thereby performing an exposure operation. During consecutive photographing, the front curtain positioned at the closing position is moved once in a direction of the open position and is then returned to the closing position after the rear curtain is moved to the open position after termination of the exposure operation at first time, and before a subsequent exposure operation is performed.

(5) According to still another aspect of the present invention, a blade-driving device is provided, including a front curtain and a rear curtain which are capable of moving between a closing position where an opening is closed and an open position where the opening is opened, and a front curtain actuator which drives the front curtain and a rear curtain actuator which drives the rear curtain. The front curtain and the rear curtain are positioned at the open position at a time of start and termination of imaging, in which the front curtain moves from the closing position to the open position, and the rear curtain moves from the open position to the closing position, thereby performing an exposure operation. The front curtain positioned at the open position is moved once in a direction of the closing position and is then returned to the open position before the rear curtain is moved to the open position after termination of the exposure operation.

(6) According to still another aspect of the present invention, an imaging apparatus is provided for controlling a blade-driving device which includes a front curtain and a rear curtain which are capable of moving between a closing position where an opening is closed and an open position where the opening is opened, and a front curtain actuator that drives the front curtain and a rear curtain actuator that drives the rear curtain, the imaging apparatus including a driving control unit which drives the front curtain actuator and the rear curtain actuator so that the front curtain and the rear curtain are positioned at the open position at a time of start and termination of imaging, so that the front curtain moves from the closing position to the open position, and the rear curtain moves from the open position to the closing position, thereby performing an exposure operation, and so that, during consecutive photographing, the front curtain positioned at the closing position is moved once in a direction of the open position and is then returned to the closing position after the rear curtain is moved to the open position after termination of the exposure operation at first time, and before a subsequent exposure operation is performed.

(7) According to still another aspect of the present invention, an imaging apparatus is provided for controlling a blade-driving device which includes a front curtain and a rear curtain which are capable of moving between a closing position where an opening is closed and an open position where the opening is opened, and a front curtain actuator that drives the front curtain and a rear curtain actuator that drives the rear curtain, the imaging apparatus including a driving control unit which drives the front curtain actuator and the rear curtain actuator so that the front curtain and the rear curtain are positioned at the open position at a time of start and termination of imaging, so that the front curtain moves from the closing position to the open position, and the rear curtain moves from the open position to the closing position, thereby performing an exposure operation, and so that the front curtain positioned at the open position is moved once in a direction of the closing position and is then returned to the open position before the rear curtain is moved to the open position after termination of the exposure operation.

According to the above-described aspects of the present invention, it is possible to obtain a satisfactory accuracy of exposure even in a consecutive operation.

BRIEF DESCRIPTION OF THE DRAWINGS

FIG. 6 is a timing chart of a focal plane shutter according to a modification example of the embodiment of the present invention.

DETAILED DESCRIPTION OF THE PREFERRED EMBODIMENTS

Figure 1:
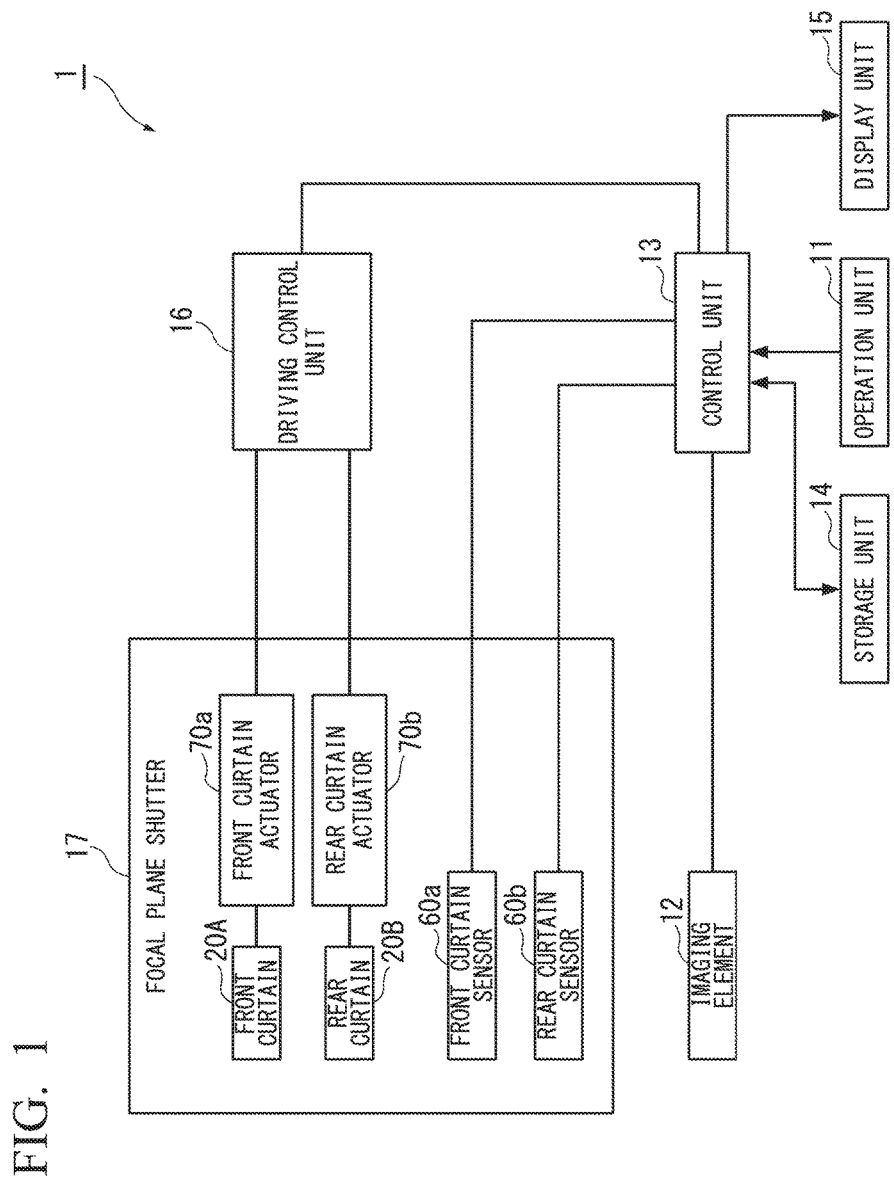
FIG. 1 is a block diagram showing a configuration example of an imaging apparatus including a focal plane shutter according to an embodiment of the present invention.

Hereinafter, embodiments of the present invention will be described with reference to the accompanying drawings. FIG. 1 is a block diagram showing a configuration example of an imaging apparatus 1 including a focal plane shutter 17 (blade-driving device) according to this embodiment. As shown in FIG. 1, the imaging apparatus 1 includes an operation unit 11, an imaging element 12, a control unit 13, a storage unit 14, a display unit 15, a driving control unit 16, and a focal plane shutter 17. In addition, the focal plane shutter 17 includes a front curtain 20A, a rear curtain 20B, a front curtain actuator 70a, a rear curtain actuator 70b, a front curtain sensor 60a, and a rear curtain sensor 60b. Although not shown in FIG. 1, the imaging apparatus 1 includes a lens for adjusting a focal distance, a diaphragm for adjusting the amount of light incident on the imaging element 12, and the like.

The imaging apparatus 1 is, for example, a camera. The imaging apparatus 1 controls the imaging element 12 and the focal plane shutter 17 to perform an exposure operation when a user's operation is detected. The imaging apparatus 1 stores data which is output by the imaging element 12 in the storage unit 14.

The operation unit 11 is a release switch or a touch panel sensor. The operation unit 11 detects the user's operation, and outputs the detected operation result to the control unit 13.

The imaging element 12 is a Complementary MOS (CMOS) sensor or a Charge-Coupled Device (CCD) sensor. The imaging element 12 converts a subject image into an electrical signal by a photoelectric conversion action, and outputs the image data of the electrical signal obtained by the conversion to the control unit 13.

The control unit 13 controls the driving control unit 16 in accordance with the operation result which is output by the operation unit 11 and controls the opening and closing of the front curtain 20A and the opening and closing of the rear curtain 20B to perform imaging. The control unit 13 stores the image data, which is output by the imaging element 12, in the storage unit 14, or displays the image data on the display unit 15.

The storage unit 14 stores captured images, a predetermined period of time which is associated with a shutter speed, and the like.

The display unit 15 displays, for example, an image captured by the imaging element 12 or a live-view movie which is output from the imaging element 12.

The driving control unit 16 controls the driving of each of the front curtain actuator 70a and the rear curtain actuator 70b of the focal plane shutter 17, in accordance with the control of the control unit 13.

The focal plane shutter 17 controls the opening and closing of the front curtain 20A and the opening and closing of the rear curtain 20B in accordance with the control of the driving control unit 16. In addition, the focal plane shutter 17 detects the position of the front curtain 20A by the front curtain sensor 60a during the driving of the front curtain 20A, and outputs front curtain position information indicating the detected position of the front curtain 20A to the control unit 13. The focal plane shutter 17 detects the position of the rear curtain 20B by the rear curtain sensor 60b during the driving of the rear curtain 20B, and outputs rear curtain position information indicating the detected position of the rear curtain 20B to the control unit 13.

The front curtain 20A is constituted by a plurality of blades, and the opening and closing of the front curtain are performed on an opening 81 to be described later by the front curtain actuator 70a.

The rear curtain 20B is constituted by a plurality of blades, and the opening and closing of the rear curtain are performed on the opening 81 to be described later by the rear curtain actuator 70b.

The front curtain actuator 70a controls the opening and closing of the front curtain 20A in accordance with the control of the driving control unit 16.

The rear curtain actuator 70b controls the opening and closing of the rear curtain 20B in accordance with the control of the driving control unit 16.

The front curtain sensor 60a includes a light-emitting element and a light-receiving element which are arranged so as to face each other. The front curtain sensor 60a may be a photocoupler or a proximity sensor. The front curtain sensor 60a detects the position of the front curtain 20A, and outputs a value indicating the detected position to the control unit 13. The rear curtain sensor 60b includes a light-emitting element and a light-receiving element which are arranged so as to face each other. The rear curtain sensor 60b may be a photocoupler or a proximity sensor. The rear curtain sensor 60b detects the position of the rear curtain 20B and outputs a value indicating the detected position to the control unit 13.

Next, a configuration example of the focal plane shutter 17 will be described.

Figure 2:
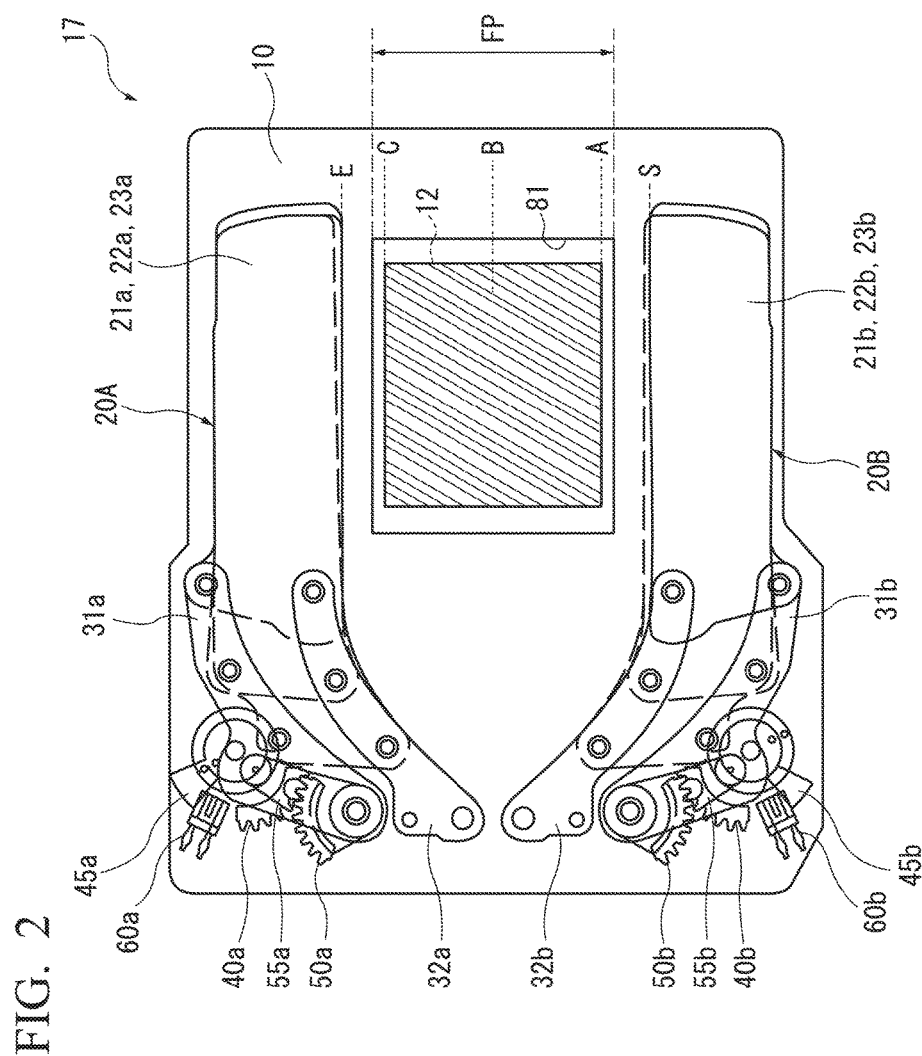
FIG. 2 is a front view of the focal plane shutter according to the embodiment of the present invention.

FIG. 2 is a front view of the focal plane shutter 17 according to this embodiment. In the example shown in FIG. 2, the front curtain actuator 70a and the rear curtain actuator 70b are not shown. The focal plane shutter 17 includes a substrate 10, the front curtain 20A, the rear curtain 20B, arms 31a, 32a, 31b, and 32b, the front curtain sensor 60a, the rear curtain sensor 60b, and the like. An opening 81 having a rectangular shape is formed in the substrate 10. In the example shown in FIG. 2, an image-forming surface of the imaging element 12 is positioned within the opening 81. In this embodiment, the height of the opening 81 is referred to as an image frame FP.

The front curtain 20A is constituted by three blades 21a to 23a. The rear curtain 20B is constituted by three blades 21b to 23b. Meanwhile, FIG. 2 shows a case where the blades 21a to 23a constituting the front curtain 20A are in an overlapping state and the blades 21b to 23b constituting the rear curtain 20B are in an overlapping state. FIG. 2 shows the focal plane shutter 17 in an initial state. In the initial state, the front curtain 20A and the rear curtain 20B retreat from the opening 81. That is, the front curtain 20A and the rear curtain 20B are positioned at an open position which is a position where the curtains retreat from the opening 81 at the time of start and termination of imaging (at a time other than an exposure operation or a preparation period of the exposure operation). In this case, the opening 81 is in an open state in the initial state, and thus it is possible to display, for example, an image captured by the imaging element 12 on the display unit 15 in a live-view operation. Meanwhile, a position where the front curtain 20A and the rear curtain 20B move from the open position shown in FIG. 2 to close the opening 81 is referred to as a closing position. In the example shown in FIG. 2, for the front curtain 20A, a position E corresponds to an open position, and a position S corresponds to a closing position. In addition, for the rear curtain 20B, the position S corresponds to an open position, and the position E corresponds to a closing position. The front curtain 20A is connected to the arms 31a and 32a. The rear curtain 20B is connected to the arms 31b and 32b. Each of the arms 31a, 32a, 31b, and 32b is rotatably supported by the substrate 10.

The blade 21a is one of the plurality of blades constituting the front curtain 20A, and is connected to the tip side of the arms 31a and 32a. In addition, the blade 21a proceeds to the opening 81 first when the front curtain 20A moves. Similarly, the blade 21b is one of the plurality of blades constituting the rear curtain 20B, and is connected to the tip side of the arms 31b and 32b. In addition, the blade 21b proceeds to the opening 81 first when the rear curtain 20B moves.

A front curtain-driving lever 55a for driving the arm 31a and a rear curtain-driving lever 55b for driving the arm 31b are provided on the substrate 10. The front curtain-driving lever 55a is connected to a gear 50a, and the rear curtain-driving lever 55b is connected to a gear 50b. The gear 50a is meshed with a gear 40a, and the gear 50b is meshed with a gear 40b.

The gear 40a is connected to a rotor of the front curtain actuator 70a, and the gear 40b is connected to a rotor of the rear curtain actuator 70b. The driving of the front curtain actuator 70a leads to the driving of the gears 40a and 50a, and thus the front curtain-driving lever 55a is driven. The driving of the front curtain-driving lever 55a leads to the driving of the arm 31a. Thereby, the front curtain 20A moves. The front curtain 20A can freely move between an open position where the front curtain retreats from the opening 81 and a closing position where the front curtain closes the opening 81. The front curtain 20A moves between the open position and the closing position by the front curtain actuator 70a. The gears 40b and 50b, the rear curtain-driving lever 55b, and the rear curtain 20B are driven in the same manner as the gears 40a and 50a, the front curtain-driving lever 55a, and the front curtain 20A.

A thin plate 45a is provided in the gear 40a, and a thin plate 45b is provided in the gear 40b. The thin plate 45a is rotated together with the gear 40a, and the thin plate 45b is rotated together with the gear 40b. Each of the thin plates 45a and 45b has a fan shape. The front curtain sensor 60a and the rear curtain sensor 60b are arranged on the substrate 10.

In addition, a first spring not shown in the drawing is connected to the arm 31a, and a second spring not shown in the drawing is connected to the arm 31b. In detail, one end of the first spring is connected to the arm 31a, and the other end of the first spring is connected to the substrate 10. One end of the second spring is connected to the arm 31b, and the other end of the second spring is connected to the substrate 10. The springs respectively bias the arms 31a and 31b so that the front curtain 20A and the rear curtain 20B retreat from the opening 81 and are positioned at the open position.

In addition, three positions A to C are shown on a trajectory where the front curtain 20A and the rear curtain 20B move. Each of the positions A to C indicates a passing position of the front curtain 20A or the rear curtain 20B which is capable of being detected by the front curtain sensor 60a or the rear curtain sensor 60b. A position E is a starting position of the tip end of the blade 21a of the front curtain 20A when the moving is started. A position S is a starting position of the tip end of the blade 21b of the rear curtain 20B when the moving is started. The position A is an end position of the imaging element 12 on the position S side. The position B is an intermediate position between the position A and the position C. The position C is an end position of the imaging element 12 on the position E side. A timing when an output signal of the front curtain sensor 60a is switched is set when the blade 21a of the front curtain 20A passes through the positions A and C. Similarly, a timing when an output signal of the rear curtain sensor 60b is switched is set when the blade 21b of the rear curtain 20B passes through the positions A and C.

Next, a configuration example of the front curtain actuator 70a will be described.

Figure 3:
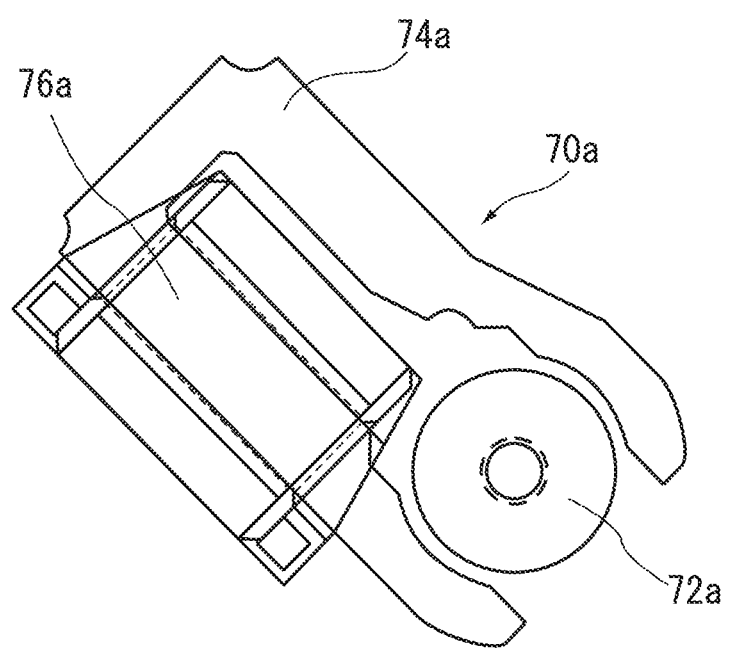
FIG. 3 is a diagram showing an example of a configuration of a front curtain actuator according to the embodiment of the present invention.

FIG. 3 is a diagram showing an example of a configuration of the front curtain actuator 70a according to this embodiment. Meanwhile, the front curtain actuator 70a is supported by the substrate 10.

The front curtain actuator 70a includes a rotor 72a, a stator 74a, and a front curtain coil 76a.

The rotor 72a is rotatably supported by the substrate 10. The rotor 72a is a permanent magnet magnetized in different poles in a circumferential direction. The stator 74a is excited by the front curtain coil 76a to generate magnetism between the stator and the rotor 72a. The front curtain coil 76a excites the stator 74a by energization from the driving control unit 16.

The rotor 72a is rotated by the energization of the front curtain coil 76a, and the arm 31a is driven so that the front curtain 20A moves. In addition, the rotor 72a is reversely rotated by the reverse energization of the front curtain coil 76a, and the front curtain 20A moves in a direction opposite to the above-described direction.

Meanwhile, the rotor 72a and the front curtain-driving lever 55a may be directly connected to each other without going through the gears 40a and 50a. In addition, for example, the arm 31a, the front curtain-driving lever 55a, the rotor 72a, and the like may be configured to be integrated with each other. That is, the arm 31a, a driving member such as the front curtain-driving lever 55a, and an electromagnetic driving source such as the front curtain actuator 70a may be configured to be integrated with each other. That is, a configuration may be adopted in which the front curtain-driving lever 55a is rotated in association with the rotation of the rotor 72a.

Meanwhile, FIG. 3 shows a configuration of the front curtain actuator 70a, and the configuration of the rear curtain actuator 70b is the same as the configuration of the front curtain actuator 70a.

Figure 4A:
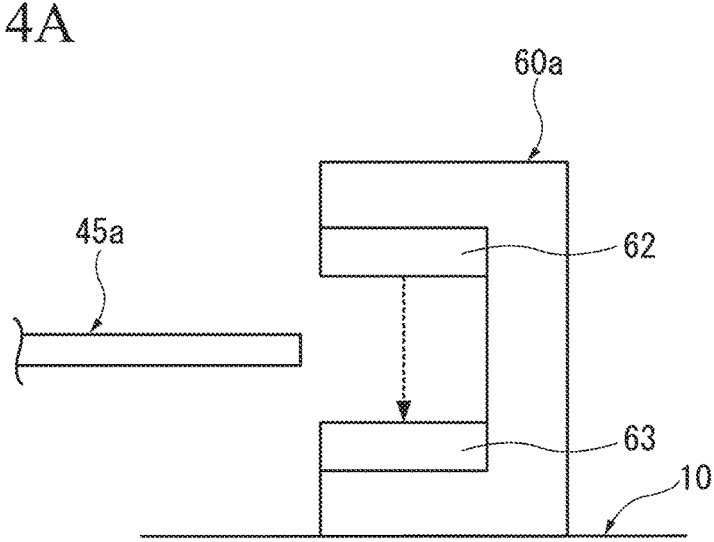
FIG. 4A is a diagram showing a configuration example of a front curtain sensor.
Figure 4B:
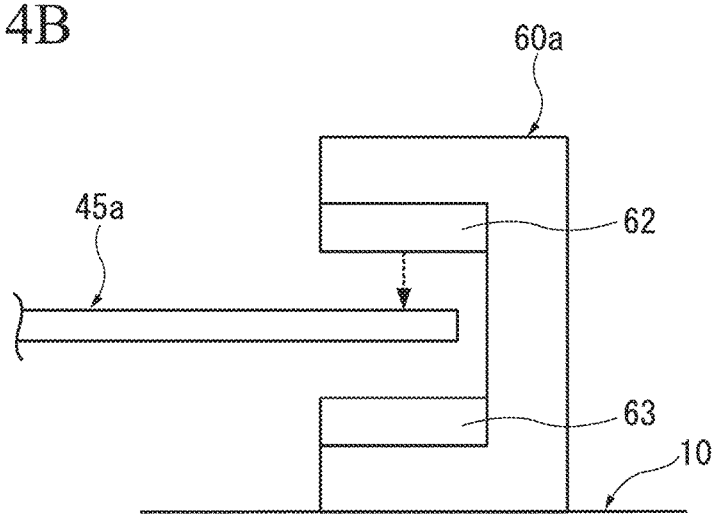
FIG. 4B is a diagram showing a configuration example of the front curtain sensor.

FIGS. 4A and 4B are diagrams showing a configuration example of the front curtain sensor 60a.

As shown in FIGS. 4A and 4B, the front curtain sensor 60a is arranged on the substrate 10. The front curtain sensor 60a includes a light-emitting element 62 and a light-receiving element 63 which are arranged so as to face each other. Light emitted from the light-emitting element 62 is received by the light-receiving element 63. As shown in FIGS. 4A and 4B, the thin plate 45a moves between the light-emitting element 62 and the light-receiving element 63 in accordance with the rotation of the gear 40a connected to the rotor 72a. When the thin plate 45a is positioned between the light-emitting element 62 and the light-receiving element 63, light emitted from the light-emitting element 62 is blocked. In this case, it is detected whether or not the thin plate 45a is positioned between the light-emitting element 62 and the light-receiving element 63 based on an output signal of the light-receiving element 63, and thus it is possible to detect the position of the front curtain-driving lever 55a through the gears 40a and 50a. As a result, it is possible to detect whether or not the front curtain 20A has passed through a predetermined position. Meanwhile, the rear curtain sensor 60b and the thin plate 45b are configured in the same manner as the front curtain sensor 60a and the thin plate 45a.

In this manner, each of the front curtain sensor 60a and the rear curtain sensor 60b of this embodiment includes a thin plate that moves in association with the rotation of a rotor, a light-emitting element, and a light-receiving element. The passage of the front curtain 20A and the rear curtain 20B, in detail, the blade 21a of the front curtain 20A and the blade 21b of the rear curtain 20B is detected in accordance with whether or not the thin plate blocks light emitted toward the light-receiving element from the light-emitting element, without contacting the light-emitting element and the light-receiving element.

Meanwhile, the sensors (the front curtain sensor 60a and the rear curtain sensor 60b ) are not limited to the above-described configurations. For example, the front curtain sensor 60a may be configured to include a light-emitting element, a mirror that reflects light emitted by the light-emitting element, and a light-receiving element that receives the light reflected by the mirror. The thin plate 45a is positioned between the light-emitting element and the mirror or between the light-receiving element and the mirror, so that it is possible to detect the position of the thin plate 45a.

Figure 5:
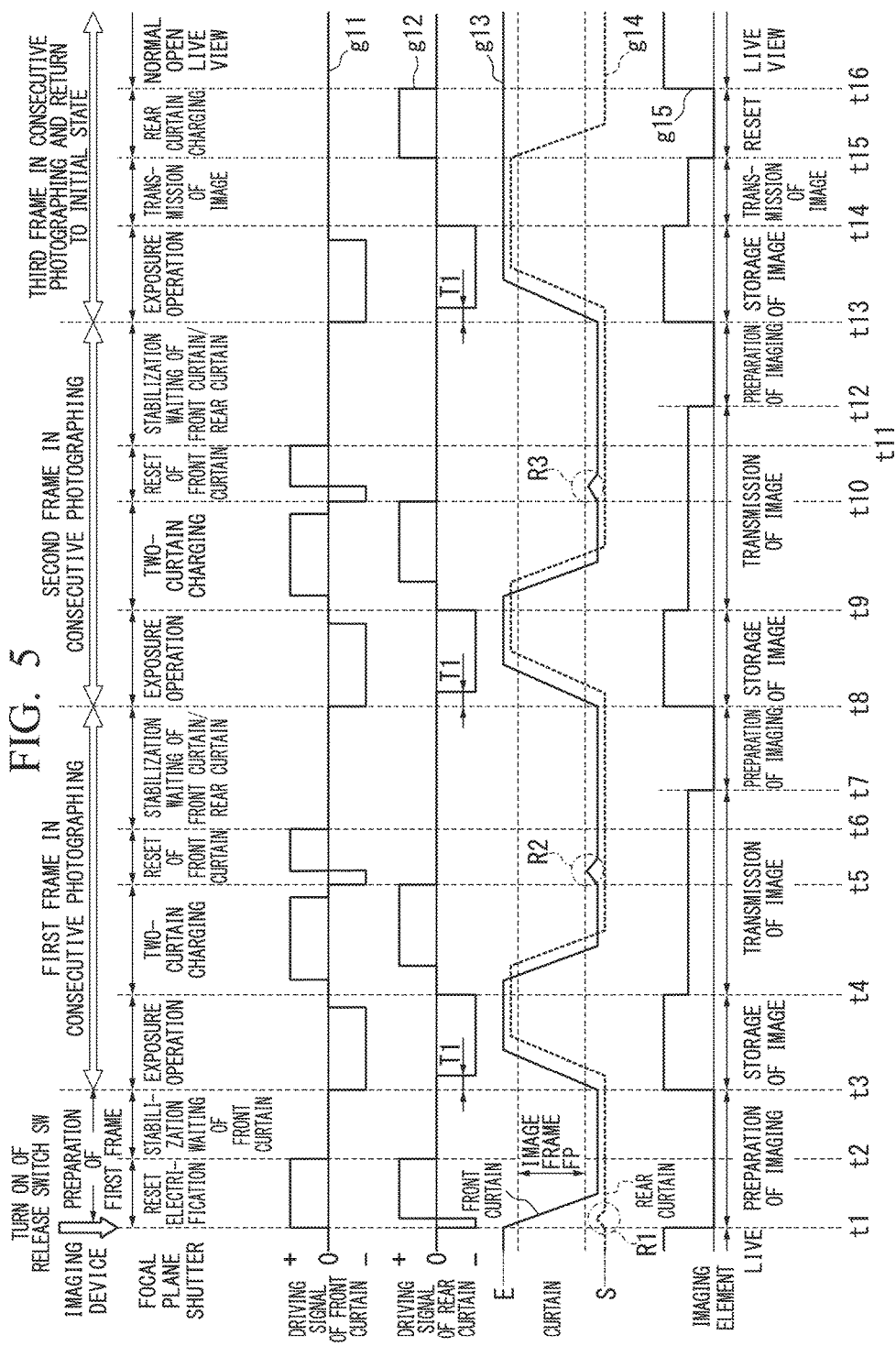
FIG. 5 is a timing chart of the focal plane shutter according to the embodiment of the present invention.

Next, an example of an operation timing of the focal plane shutter 17 will be described. FIG. 5 shows an operation example during consecutive photographing of the focal plane shutter 17. In more detail, FIG. 5 shows an operation example in a case where the release switch constituting the operation unit 11 is turned on by the user at a time t1 and is then turned off after the elapse of a fixed period of time to consecutively capture still images for three frames. In FIG. 5, the horizontal axis represents a time. However, an interval between times is appropriately increased or reduced to facilitate understanding. A waveform g11 indicates a waveform of a driving signal which is input to the front curtain actuator 70a. A waveform g12 indicates a waveform of a driving signal which is input to the rear curtain actuator 70b. A waveform g13 indicates the position of the front curtain 20A. A waveform g14 indicates the position of the rear curtain 20B. A waveform g15 is an image illustrating an operation state of the imaging element 12.

Meanwhile, an example shown in FIG. 5 is an example where a current is supplied to each of the front curtain actuator 70a and the rear curtain actuator 70b as a driving signal.

In an image frame open period which is a period in which a current is not supplied to each of the front curtain actuator 70a and the rear curtain actuator 70b until a time t1, the front curtain 20A and the rear curtain 20B are in an open state. For this reason, light is emitted to the imaging element 12. In a period until the time t1, the control unit 13 sets the imaging element 12 to be in a live-view operation mode, and displays image data which is output by the imaging element 12 on the display unit 15.

At the time t1, the operation unit 11 detects that an on-state is set by the release switch being pressed by a user. At the time t1, the driving control unit 16 outputs electric power having a predetermined positive current value to the front curtain actuator 70a. Thereby, the front curtain 20A starts a front curtain-charging operation (an operation of closing the image frame FP). At the time t1, the driving control unit 16 outputs electric power having a predetermined negative current value to the rear curtain actuator 70b to start a reset operation of the position of the rear curtain 20B. At the time t1, the front curtain 20A is positioned at the position E, and the rear curtain 20B is positioned at the position S. Meanwhile, in this embodiment, the reset operation means an operation of moving the curtain, which is positioned at the open position or the closing position, in a direction opposite to the closing position or the open position once and then moving the curtain to the open position or the closing position again.

After the time t1, the driving control unit 16 outputs electric power having a predetermined negative current value to the rear curtain actuator 70b for a predetermined period, reverses the positive or negative of the current, and outputs electric power having a predetermined positive current value to the rear curtain actuator 70b. Thereby, as shown in a region R1, the rear curtain 20B is moved once in a direction of the closing position from a state where the rear curtain is positioned at the open position, and is then returned to the open position again.

After the time t1, the front curtain 20A reaches a closed position which is an exposure operation starting position in a period until a time t2. That is, a state is set where the front curtain 20A closes the image frame FP (opening 81).

The driving control unit 16 sets a current value of a front curtain-driving signal and a current value of a rear curtain-driving signal to 0 at the time t2, stops the supply of electric power to the front curtain actuator 70a until a time t3, and stops the supply of electric power to the rear curtain actuator 70b.

In a period between the time t2 and the time t3, a state is set where the front curtain 20A is stopped at the closing position which is an exposure operation starting position, the rear curtain 20B is stopped at the position S which is an open position, and the image frame (opening 81) is closed by the front curtain 20A.

Meanwhile, in the focal plane shutter 17, a period between the time t1 and the time t2 is a period in which the front curtain 20A is charged and a period in which the position of the rear curtain 20B is reset. In addition, a period between the time t2 and the time t3 is set in advance to stabilize the front curtain 20A, and is a predetermined period of time stored in the storage unit 14. In addition, a period between the time t1 and the time t3 is a period in which the imaging apparatus 1 prepares a first frame in consecutive photographing, and is a period in which the imaging element 12 prepares imaging.

At the time t3, the driving control unit 16 outputs electric power having a predetermined negative current value to the front curtain actuator 70a. Thereby, the front curtain 20A starts an operation of opening the image frame FP (opening 81). After a period of time T1 from the time t3, the driving control unit 16 outputs electric power having a predetermined negative current value to the rear curtain actuator 70b. Thereby, the rear curtain 20B starts an operation of closing the image frame FP (opening 81). The period of time T1 is a period of time stored in the storage unit 14 with respect to a shutter speed. In a period until a time t4 after a predetermined period of time from a time t3, the driving control unit 16 sequentially stops the supply of electric power to the front curtain actuator 70a and stops the supply of electric power to the rear curtain actuator 70b. Specifically, the driving control unit 16 stops the supply of electric power to the front curtain actuator 70a, and then stops the supply of electric power to the front curtain actuator 70a at a time when the bound of the front curtain 20A converges after the front curtain 20A moves to the open position. In addition, the driving control unit 16 stops the supply of electric power to the rear curtain actuator 70b at a time when the bound of the rear curtain 20B converges after the rear curtain 20B moves to the closing position. In a period until a time t4 after a predetermined period of time from the time t3, an exposure operation is performed in the focal plane shutter 17 by the front curtain 20A moving from a closing position to an open position and the rear curtain 20B moving from an open position to a closing position while following the moving of the front curtain 20A. The period until the time t4 after a predetermined period of time from the time t3 corresponds to an image storage period in the imaging element 12. In this period, the imaging element 12 performs an exposure operation, that is, the storage of image data.

Next, in a period between the time t4 and a time t5, the driving control unit 16 sequentially starts the output of electric power having a predetermined positive current value to the front curtain actuator 70a and starts the output of electric power having a predetermined positive current value to the rear curtain actuator 70b. In addition, after a predetermined period of time from the time t4, the driving control unit 16 sequentially stops the supply of electric power to the front curtain actuator 70a and stops the supply of electric power to the rear curtain actuator 70b. Meanwhile, in the example shown in FIG. 5, the driving control unit 16 stops the supply of electric power to the rear curtain actuator 70b at the time t4. Thereby, the front curtain 20A starts an operation of closing the image frame FP (opening 81) (charging operation), and subsequently, the rear curtain 20B starts an operation of opening the image frame FP (opening 81) (charging operation). Here, the front curtain 20A first starts closing the opening 81, and subsequently, the rear curtain 20B moves in the same direction to open the opening 81, so that the closed state of the opening 81 is maintained. Therefore, it is possible to simultaneously execute a charging operation of the front curtain 20A and a charging operation of the rear curtain 20B in parallel by providing a fixed time difference therebetween in a state where the opening 81 is closed.

Next, at the time t5, the driving control unit 16 starts a reset operation of the front curtain 20A. That is, at the time t5, the driving control unit 16 outputs electric power having a predetermined negative current value to the front curtain actuator 70a for a predetermined period, and then outputs electric power having a predetermined positive current value to the front curtain actuator 70a for a predetermined period (a period until a time t6 in FIG. 5). Thereby, as shown in a region R2, the front curtain 20A is moved once in a direction of the open position from a state where the front curtain is positioned at the closing position, as a reset operation, and is then returned to the closing position again. It is possible to reduce the influence of an impact, accompanied by the charging operation of the rear curtain 20B, which occurs in a period between the time t4 and the time t5 on the position of the front curtain 20A by the reset operation of the front curtain 20A in the region R2. Meanwhile, the reset operation of the front curtain 20A is also referred to as an operation of performing reset energization on the front curtain actuator 70a. According to the example shown in FIG. 5, in the reset operation of the front curtain 20A, a position (position of a peak of a cone shape) to which the front curtain is moved once in a direction of the open position from a state where the front curtain is positioned at the closing position is set to be a position that does not reach the lower end of the image frame FP. In this case, even when the reset operation of the front curtain 20A is performed, the opening 81 is covered with the front curtain 20A at all times, and the opening 81 is maintained in a state where light is shielded. In other words, the opening 81 is maintained in a closed state. In this configuration, it is possible to perform a reset operation of the front curtain 20A and an image transmission operation of the imaging element 12 in parallel in a state where light is not incident on the imaging element 12.

The driving control unit 16 executes the reset operation of the front curtain 20A in a period between the time t5 and the time t6, and then stops the supply of electric power to the front curtain actuator 70a until a time t8 and continuously stops the supply of electric power to the rear curtain actuator 70b. The period until the time t8 is a standby period for stabilizing the positions of the front curtain 20A and the rear curtain 20B. On the other hand, the imaging element 12 sweeps out stored image data to the control unit 13 in a period between the time t4 and the time t7. In this operation example, although two curtains of the front curtain 20A and the rear curtain 20B are simultaneously charged (also referred to as two-curtain charging) after the period of the exposure operation is terminated at the time t4, the opening 81 is in a closed state without being completely opened, and thus it is possible to execute a two-curtain-charging operation and an image transmission operation in parallel.

Next, the imaging element 12 is set to be in an imaging preparation period from the time t7 to the time t8. In the focal plane shutter 17, a period between the time t5 and the time t6 is a front curtain reset period, and a period between the time t6 and the time t8 is a stabilization-waiting period of the front curtain 20A and the rear curtain 20B. In the imaging apparatus 1, a period between the time t3 and the time t8 corresponds to an imaging operation period for a first frame during consecutive photographing.

Next, at the time t8, the driving control unit 16 outputs electric power having a predetermined negative current value to the front curtain actuator 70a, similar to the case at the time t3. Thereby, the front curtain 20A starts performing an operation of opening the image frame FP (opening 81). After the period of time T1 from the time t8, the driving control unit 16 outputs electric power having a predetermined negative current value to the rear curtain actuator 70b. Thereby, the rear curtain 20B starts an operation of closing the image frame FP (opening 81). In a period until a time t9 after a predetermined period of time from the time t8, the driving control unit 16 sequentially stops the supply of electric power to the front curtain actuator 70a and stops the supply of electric power to the rear curtain actuator 70b. In a period until the time t9 after a predetermined period of time from the time t8, an exposure operation is performed in the focal plane shutter 17 by the front curtain 20A moving from a closing position to an open position and the rear curtain 20B moving from an open position to a closing position while following the moving of the front curtain 20A. The period until the time t9 after a predetermined period of time from the time t8 corresponds to an image storage period in the imaging element 12. In this period, the imaging element 12 performs an exposure operation, that is, the storage of image data.

Next, in a period between the time t9 and a time t10, the driving control unit 16 sequentially starts the output of electric power having a predetermined positive current value to the front curtain actuator 70a and starts the output of electric power having a predetermined positive current value to the rear curtain actuator 70b. In addition, after a predetermined period of time from the time t9, the driving control unit 16 sequentially stops the supply of electric power to the front curtain actuator 70a and stops the supply of electric power to the rear curtain actuator 70b. Meanwhile, in the example shown in FIG. 5, the driving control unit 16 stops the supply of electric power to the rear curtain actuator 70b at the time t9. Thereby, the front curtain 20A starts an operation of closing the image frame FP (opening 81) (charging operation), and subsequently, the rear curtain 20B starts an operation of opening the image frame FP (opening 81) (charging operation).

Next, at the time t10, the driving control unit 16 starts a reset operation of the front curtain 20A. That is, at the time t10, the driving control unit 16 outputs electric power having a predetermined negative current value to the front curtain actuator 70a for a predetermined period, and then outputs electric power having a predetermined positive current value to the front curtain actuator 70a for a predetermined period (a period until a time t11 in FIG. 5). Thereby, as shown in a region R3, the front curtain 20A is moved once in a direction of the open position from a state where the front curtain is positioned at the closing position, as a reset operation, and is then returned to the closing position again. It is possible to reduce the influence of an impact, accompanied by the charging operation of the rear curtain 20B, which occurs in a period between the time t9 and the time t10 on the position of the front curtain 20A by the reset operation of the front curtain 20A in the region R3.

The driving control unit 16 executes the reset operation of the front curtain 20A in a period between the time t10 and the time t11, and then stops the supply of electric power to the front curtain actuator 70a until a time t13 and continuously stops the supply of electric power to the rear curtain actuator 70b. The period until the time t13 is a standby period for stabilizing the positions of the front curtain 20A and the rear curtain 20B. On the other hand, the imaging element 12 sweeps out stored image data to the control unit 13 in a period between the time t9 and the time t12. Next, the imaging element 12 is set to be in an imaging preparation period from the time t12 to the time t13. In the focal plane shutter 17, a period between the time t10 and the time t11 is a front curtain reset period, and a period between the time t11 and the time t13 is a stabilization-waiting period of the front curtain 20A and the rear curtain 20B. In the imaging apparatus 1, a period between the time t8 and the time t13 corresponds to an imaging operation period for a second frame during the consecutive photographing.

Next, at the time t13, the driving control unit 16 outputs electric power having a predetermined negative current value to the front curtain actuator 70a, similar to the cases at the times t3 and t8. Thereby, the front curtain 20A starts performing an operation of opening the image frame FP (opening 81). After the period of time T1 from the time t13, the driving control unit 16 outputs electric power having a predetermined negative current value to the rear curtain actuator 70b. Thereby, the rear curtain 20B starts an operation of closing the image frame FP (opening 81). In a period until a time t14 after a predetermined period of time from the time t13, the driving control unit 16 sequentially stops the supply of electric power to the front curtain actuator 70a and stops the supply of electric power to the rear curtain actuator 70b. In a period until the time t14 after a predetermined period of time from the time t13, an exposure operation is performed in the focal plane shutter 17 by the front curtain 20A moving from a closing position to an open position and the rear curtain 20B moving from an open position to a closing position while following the moving of the front curtain 20A. The period until the time t14 after a predetermined period of time from the time t13 corresponds to an image storage period in the imaging element 12. In this period, the imaging element 12 performs an exposure operation, that is, the storage of image data.

Next, in a period between the time t14 and a time t15, the driving control unit 16 stops the supply of electric power to the front curtain actuator 70a and stops the supply of electric power to the rear curtain actuator 70b. On the other hand, the imaging element 12 sweeps out stored image data to the control unit 13 in a period between the time t14 and the time t15. Next, at the time t15, the driving control unit 16 outputs electric power having a predetermined positive current value to the rear curtain actuator 70b. Thereby, the rear curtain 20B starts an operation of opening the image frame FP (opening 81). Next, at a time t16, the driving control unit 16 stops the supply of electric power to the rear curtain actuator 70b. On the other hand, the imaging element 12 resets the stored image data in a period between the time t15 and the time t16 and performs a live-view operation after the time t16, so that a movie captured by the imaging element 12 is displayed on the display unit 15. In the focal plane shutter 17, a period between the time t15 and the time t16 is a rear curtain-charging operation period, and a period after the time t16 is a period in which the front curtain 20A and the rear curtain 20B are set to be in an initial state to perform a normal open live-view operation. Meanwhile, the normal open live-view operation is an operation of displaying a movie captured by the imaging element 12 on the display unit 15 in a state where the opening 81 is opened. On the other hand, an abnormal live-view operation is an operation of setting the opening 81 to be in a normal closed state during the consecutive photographing and displaying a still image captured one frame before on the display unit 15 for a predetermined period of time, similar to the configuration disclosed in Japanese Unexamined Patent Application, First Publication No. 2014-191225. In the imaging apparatus 1, a period after the time t13 corresponds to a period between an imaging operation for a third frame during the consecutive photographing and return to the initial state.

Here, a modification example of this embodiment will be described.

FIG. 6 is a timing chart of a focal plane shutter according to a modification example of the embodiment of the present invention. In FIG. 6, as shown in regions R4 and R5, only a driving sequence of a front curtain which is performed after an exposure operation is different from that in FIG. 5. Hereinafter, this driving sequence will be described.

At a time t3, a front curtain 20A starts moving from a closing position to an open position, and a rear curtain 20B starts moving from an open position to a closing position after a period of time T1 from the time t3, so that an exposure operation is performed. In addition, the imaging element 12 performs the storage of image data in a period until a time t4 after a predetermined period of time from the time t3. In the modification example of this embodiment, at the time t4, the driving control unit 16 starts a reset operation of the front curtain 20A. That is, after electric power having a predetermined positive current value is output to a front curtain actuator 70a for a predetermined period from the time t4, the positive or negative of a current is reversed, and electric power having a predetermined negative current value is output to the front curtain actuator 70a. Meanwhile, the reset operation of the front curtain 20A is performed in a state where the rear curtain 20B closes an image frame FP, and thus the closed state of the opening 81 is maintained. Therefore, it is possible to perform the reset operation of the front curtain 20A and an image transmission operation of the imaging element 12 in parallel in a state where light is not incident on the imaging element 12.

Thereby, as shown in the region R4, the front curtain 20A is moved once in a direction of the closing position from the state where the front curtain is positioned at the open position, and is then returned to the open position again. It is possible to reduce the influence of an impact, accompanied by the exposure operation of the rear curtain 20B, which occurs in a period between the time t3 and the time t4 on the position of the front curtain 20A by the reset operation of the front curtain 20A in the region R4.

Thereafter, similarly to FIG. 5, charging operations of the front curtain 20A and the rear curtain 20B are performed. That is, in a period until a time t5, the driving control unit 16 sequentially starts the output of electric power having a predetermined positive current value to the front curtain actuator 70a and starts the output of electric power having a predetermined positive current value to the rear curtain actuator 70b. In addition, after a predetermined period of time from the start of output to the front curtain actuator 70a and the rear curtain actuator 70b, the driving control unit 16 sequentially stops the supply of electric power to the front curtain actuator 70a and the rear curtain actuator 70b. Meanwhile, after the front curtain 20A starts an operation of closing the image frame FP, the rear curtain 20B starts an operation of opening the image frame FP, and thus the closed state of the opening 81 is maintained. Therefore, it is possible to simultaneously execute a charging operation of the front curtain 20A and a charging operation of the rear curtain 20B in parallel by providing a fixed time difference therebetween in a state where the opening 81 is closed.

Similarly, at a time t9, the driving control unit 16 starts a reset operation of the front curtain 20A. That is, after electric power having a predetermined positive current value is output to the front curtain actuator 70a for a predetermined period from the time t9, the positive or negative of a current is reversed, and electric power having a predetermined negative current value is output to the front curtain actuator 70a. Thereby, as shown in the region R5, the front curtain 20A is moved once in a direction of the closing position from the state where the front curtain is positioned at the open position, and is then returned to the open position again. It is possible to reduce the influence of an impact, accompanied by the exposure operation of the rear curtain 20B, which occurs in a period between the time t8 and the time t9 on the position of the front curtain 20A by the reset operation of the front curtain 20A in the region R5.

As described above, the imaging apparatus 1 of this embodiment includes a focal plane shutter 17 (blade-driving device) and a driving control unit 16. The focal plane shutter 17 includes a substrate 10 that includes the opening 81, the front curtain 20A and the rear curtain 20B which can move between a closing position where the opening 81 is closed and an open position where the opening 81 is opened, and the front curtain actuator 70a and the rear curtain actuator 70b which respectively drive the front curtain 20A and the rear curtain 20B. In addition, the driving control unit 16 drives the front curtain actuator 70a and the rear curtain actuator 70b. In the focal plane shutter 17, the front curtain 20A and the rear curtain 20B are positioned at the open position at the time of start and termination of imaging, and the front curtain 20A moves from the closing position to the open position and the rear curtain 20B moves from the open position to the closing position, thereby performing an exposure operation. In the focal plane shutter 17, after the rear curtain 20B is moved to the open position after the first exposure operation is terminated during consecutive photographing, the front curtain 20A positioned at the closing position is moved once in a direction of the open position before the subsequent exposure operation and is then returned to the closing position. With such a configuration, even when switching from normal open to normal closed is performed during consecutive photographing, the reset energization of the front curtain 20A is performed after the rear curtain 20B is returned (after the rear curtain is moved to the open position) after a second shot, and thus it is possible to obtain a satisfactory accuracy of exposure even in a consecutive operation without being influenced by an impact when the rear curtain 20B is returned.

In addition, according to this embodiment, as shown in FIG. 5, the operation of the rear curtain and the operation of the front curtain are performed in this order at all times, regardless of the number of frames (for example, regardless of whether being for a first frame or after a second frame) before an exposure operation. In this case, for example, even when a configuration is used in which some difference occurs between the position of the front curtain and the position of the rear curtain depending on the order of operations (whether the operation of the front curtain is performed after the operation of the rear curtain or the operation of the rear curtain is performed after the operation of the front curtain), the order of operations is fixed at all times regardless of the number of frames, and thus it is possible to suppress influence due to the order.

In the imaging apparatus 1 according to the modification example of this embodiment, before the rear curtain 20B is moved to the open position after the termination of a first exposure operation during consecutive photographing, the front curtain 20A positioned at the open position is moved once in a direction of the closing position and is then returned to the open position. With such a configuration, the reset energization of the front curtain 20A is performed immediately after the termination of the first exposure operation during the consecutive photographing, and thus it is possible to obtain a satisfactory accuracy of exposure even in a consecutive operation without being influenced by an impact when the exposure operation of the rear curtain 20B is performed.

Meanwhile, the embodiment of the present invention is not limited to the above-described imaging apparatus. For example, in the above-described embodiment, in the reset operation of the front curtain 20A during consecutive photographing, a position (position of a peak of a cone shape) to which the front curtain is moved once in a direction of the open position from a state where the front curtain is positioned at the closing position is set to be a position that does not reach the lower end of the image frame FP, but the position may be set to be a position beyond the lower end of the image frame FP. In this case, the closed state of the opening 81 is canceled in association with the reset operation, but the reset operation of the front curtain 20A may be performed, for example, after the termination of transmission of an image from the imaging element 12. In FIG. 2, the front curtain sensor 60a or the rear curtain sensor 60b may not be provided, or the upper and lower positions of the front curtain 20A and the rear curtain 20B may be reversed.

In the imaging apparatus 1 according to the modification example of this embodiment, a description has been given of a configuration in which before the rear curtain 20B is moved to the open position after the termination of the first exposure operation during consecutive photographing, the front curtain 20A positioned at the open position is moved once in a direction of the closing position and is then returned to the open position, but such an operation may be normally performed after the termination of an exposure operation. That is, before the rear curtain 20B is moved to the open position after the termination of the exposure operation, the front curtain 20A positioned at the open position may be moved once in a direction of the closing position and may then be returned to the open position. With such a configuration, the reset energization of the front curtain 20A is normally performed immediately after the termination of the exposure operation, and thus it is possible to obtain a satisfactory accuracy of exposure even in the subsequent exposure operation without being influenced by an impact when the exposure operation of the rear curtain 20B is performed.

Meanwhile, in this embodiment, a description has been given of a case where the opening 81 is formed on the substrate 10, but the invention is not limited to this configuration. The opening 81 may be provided in a member different from the substrate 10.

Meanwhile, in the modification example of this embodiment, a description has been given of an example in which the reset energization of the front curtain 20A is performed immediately after the termination of the exposure operation, and the reset energization of the front curtain 20A is performed after the charging operations of the front curtain 20A and rear curtain 20B are performed after the termination of the exposure operation and is performed before the subsequent exposure operation, but it is possible to obtain a satisfactory accuracy of exposure even in a consecutive operation by only performing the reset energization of the front curtain 20A immediately after the termination of the exposure operation.

Meanwhile, a description has been given of an example in which a period of time T1 corresponding to a shutter speed is a period of time stored in the storage unit 14, but the invention is not limited thereto. The period of time T1 may be determined based on the output of the front curtain sensor 60a and the period of time stored in the storage unit 14, and the period of time T1 may be determined based on the output of the front curtain sensor 60a. For example, the rear curtain 20B may be made to move by outputting electric power to the rear curtain actuator 70b after a predetermined period of time after detecting that the blade 21a of the front curtain 20A has passed through the position C by the front curtain sensor 60a, and the rear curtain 20B may be made to move by outputting electric power to the rear curtain actuator 70b after detecting that the blade 21a of the front curtain 20A has passed through the position A by the front curtain sensor 60a.

Meanwhile, the control unit 13 and the driving control unit 16 may be executed by recording a program for realizing the functions of the control unit 13 and the driving control unit 16 in this embodiment on a computer-readable recording medium, reading the program recorded on the recording medium into a computer system, and executing the program. Meanwhile, the "computer system" as used herein includes an OS or hardware such as peripheral devices. In addition, it is assumed that the "computer system" also includes a WWW system including a homepage-providing environment (or a display environment). In addition, examples of the "computer-readable recording medium" include portable media, such as a flexible disk, a magneto-optic disc, a ROM, and a CD-ROM, and a storage device, such as a hard disk built in a computer system. Further, it is assumed that the "computer-readable recording medium" also includes a medium that stores a program for a predetermined period of time like a volatile memory (RAM) in a computer system, which serves as a server or a client when a program is transmitted through a network, such as the Internet, or a communication line, such as a telephone line.

In addition, the program described above may also be transmitted from a computer system, which has a storage device or the like that stores the program, to other computer systems through a transmission medium or a transmission wave in the transmission medium. Here, the "transmission medium" to transmit a program refers to a medium having a function of transmitting information, such as a network (communication network) including the Internet or a communication line including a telephone line. In addition, the program described above may be provided to realize a part of the function described above. Further, the program may be a so-called differential file (differential program) that can realize the above function in combination with a program already recorded in a computer system.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging apparatus, comprising:
a blade-driving device which includes a front curtain and a rear curtain which are capable of moving between a closing position where an opening is closed and an open position where the opening is opened, and a front curtain actuator that drives the front curtain and a rear curtain actuator that drives the rear curtain; and
a driving control unit which drives the front curtain actuator and the rear curtain actuator,
wherein the front curtain and the rear curtain are positioned at the open position at a time of start and termination of imaging,
wherein the front curtain moves from the closing position to the open position, and the rear curtain moves from the open position to the closing position, thereby performing an exposure operation, and
wherein, during consecutive photographing, the front curtain positioned at the closing position is moved once in a direction of the open position and is then returned to the closing position after the rear curtain is moved to the open position after termination of the exposure operation at first time, and before a subsequent exposure operation is performed.

2. The imaging apparatus according to claim 1,
wherein, during the consecutive photographing, the front curtain positioned at the closing position is moved once in a direction of the open position while maintaining the opening in a closed state and is then returned to the closing position after the rear curtain is moved to the open position after termination of the exposure operation at first time, and before the subsequent exposure operation is performed.

3. An imaging apparatus, comprising:
a blade-driving device which includes a front curtain and a rear curtain which are capable of moving between a closing position where an opening is closed and an open position where the opening is opened, and a front curtain actuator that drives the front curtain and a rear curtain actuator that drives the rear curtain; and
a driving control unit which drives the front curtain actuator and the rear curtain actuator,
wherein the front curtain and the rear curtain are positioned at the open position at a time of start and termination of imaging,
wherein the front curtain moves from the closing position to the open position, and the rear curtain moves from the open position to the closing position, thereby performing an exposure operation, and
wherein the front curtain positioned at the open position is moved once in a direction of the closing position and is then returned to the open position before the rear curtain is moved to the open position after termination of the exposure operation.

4. A blade-driving device comprising:
a front curtain and a rear curtain which are capable of moving between a closing position where an opening is closed and an open position where the opening is opened; and
a front curtain actuator which drives the front curtain and a rear curtain actuator which drives the rear curtain,
wherein the front curtain and the rear curtain are positioned at the open position at a time of start and termination of imaging,
wherein the front curtain moves from the closing position to the open position, and the rear curtain moves from the open position to the closing position, thereby performing an exposure operation, and
wherein, during consecutive photographing, the front curtain positioned at the closing position is moved once in a direction of the open position and is then returned to the closing position after the rear curtain is moved to the open position after termination of the exposure operation at first time, and before a subsequent exposure operation is performed.

5. A blade-driving device comprising:
a front curtain and a rear curtain which are capable of moving between a closing position where an opening is closed and an open position where the opening is opened; and
a front curtain actuator which drives the front curtain and a rear curtain actuator which drives the rear curtain,
wherein the front curtain and the rear curtain are positioned at the open position at a time of start and termination of imaging,
wherein the front curtain moves from the closing position to the open position, and the rear curtain moves from the open position to the closing position, thereby performing an exposure operation, and
wherein the front curtain positioned at the open position is moved once in a direction of the closing position and is then returned to the open position before the rear curtain is moved to the open position after termination of the exposure operation.

6. An imaging apparatus controlling a blade-driving device which includes a front curtain and a rear curtain which are capable of moving between a closing position where an opening is closed and an open position where the opening is opened, and a front curtain actuator that drives the front curtain and a rear curtain actuator that drives the rear curtain, the imaging apparatus comprising:
a driving control unit which drives the front curtain actuator and the rear curtain actuator so that the front curtain and the rear curtain are positioned at the open position at a time of start and termination of imaging, so that the front curtain moves from the closing position to the open position, and the rear curtain moves from the open position to the closing position, thereby performing an exposure operation, and so that, during consecutive photographing, the front curtain positioned at the closing position is moved once in a direction of the open position and is then returned to the closing position after the rear curtain is moved to the open position after termination of the exposure operation at first time, and before a subsequent exposure operation is performed.

7. An imaging apparatus controlling a blade-driving device which includes a front curtain and a rear curtain which are capable of moving between a closing position where an opening is closed and an open position where the opening is opened, and a front curtain actuator that drives the front curtain and a rear curtain actuator that drives the rear curtain, the imaging apparatus comprising:

a driving control unit which drives the front curtain actuator and the rear curtain actuator so that the front curtain and the rear curtain are positioned at the open position at a time of start and termination of imaging, so that the front curtain moves from the closing position to the open position, and the rear curtain moves from the open position to the closing position, thereby performing an exposure operation, and so that the front curtain positioned at the open position is moved once in a direction of the closing position and is then returned to the open position before the rear curtain is moved to the open position after termination of the exposure operation.

\* \* \* \* \*